DATA PROCESSING APPARATUS

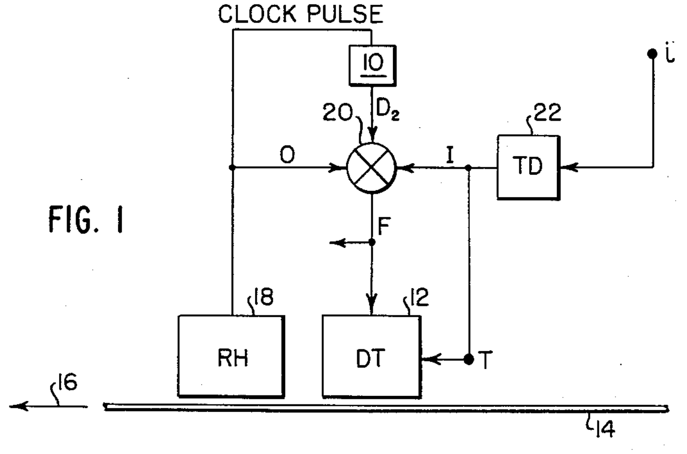
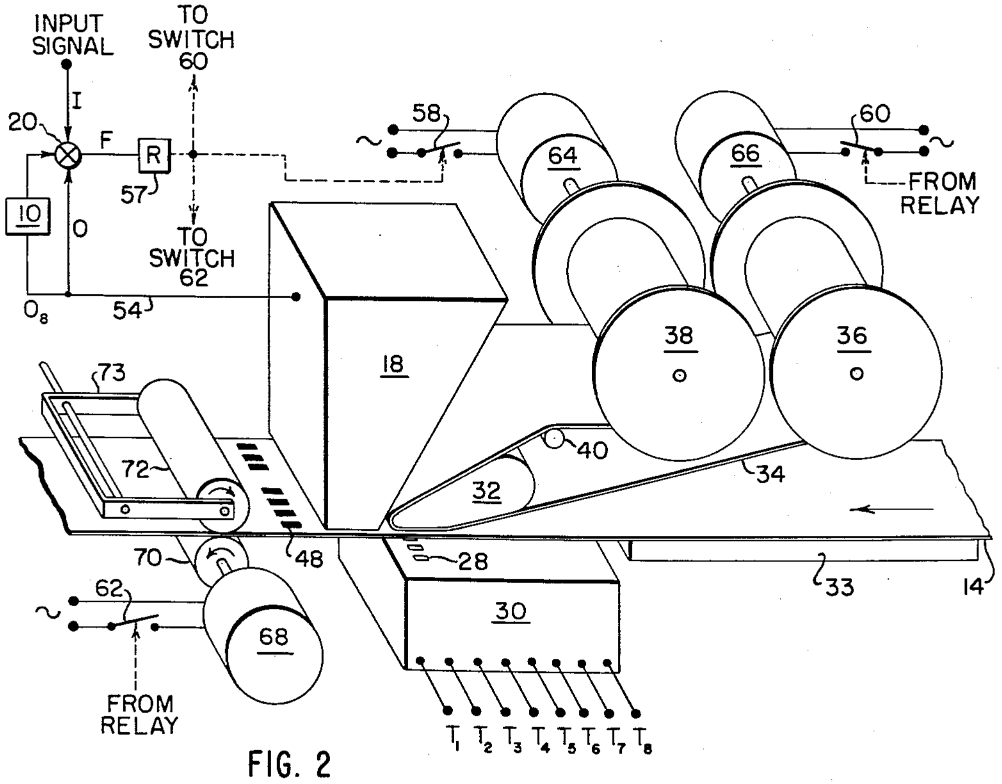
FIG. 2
INVENTORS
RALPH BERGER
HUGH E. HARLOW
BY
KENWAY, JENNEY, WITTER & HILDRETH
ATTORNEYS Jan. 9, 1962 R. BERGER ETAL 3,016,008

Filed Dec. 16, 1959 2 Sheets-Sheet 2

INVENTORS
RALPH BERGER
HUGH E. HARLOW
BY
KENWAY, JENNEY, WITTER & HILDRETH
ATTORNEYS

3,016,008
DATA PROCESSING APPARATUS

Ralph Berger, Wellesley, and Hugh E. Harlow, Reading, Mass., assignors to Anelex Corporation, Boston, Mass., a corporation of New Hampshire Filed Dec. 16, 1959, Ser. No. 859,893
7 Claims. (Cl. 101—93)

This invention relates in general to new and improved data processing apparatus and in particular to self-checking data processing apparatus in which data in the form of electrical signals are converted to data characters having physical form in a data storage medium.

In data processing apparatus, particularly in data printers in which characters are printed on a moving data tape, it is often desirable to check the accuracy of each data character in order to preclude cumulative errors and to avoid the necessity of re-printing large portions of the data. The necessity for carrying out such checks is particularly pronounced where data in digital form are transferred to the tape. As a rule, the separate binary digits are represented by the same data symbol, e.g. a point or a line, the complete data character being composed of various combinations of these data symbols. It is not uncommon in the process of rapidly transferring data in electrical form to a data storage medium for some of the parts of the system to malfunction. The erroneous presence or absence of a single data symbol in the digital code can alter the entire data character.

The present invention is directed to data processing apparatus in which each character, after it is transferred to the data storage medium, is checked against the input signal (or an equivalent signal derived therefrom) from which it originated. Typically the characters are checked prior to the time when the subsequently arriving input signal actuates the apparatus to transfer another data character to the data storage medium and the checking is carried out independently of other checking procedures in the data processing system such as, for example, parity checking. As such, it serves to supplement such other checks and to enhance the statistical probability of obtaining accurate results.

In the present invention, this checking procedure is carried out by means of apparatus adapted to observe or "read" the physical form of each data character that is transferred to a data storage medium. An output signal corresponding to the physical form of the transferred data character is compared against the input signal (or its equivalent) which gave rise to the character by means of suitable logical circuits. Apparatus responsive to the comparison may be employed to regulate further data transfer to the transfer medium automatically or, alternatively, to provide a warning signal when an error occurs.

Accordingly, it is the primary object of this invention to provide self-checking data processing apparatus wherein increased accuracy is obtained by automatically checking each data character which is transferred to a data storage medium.

This and other objects of the invention together with further features and advantages thereof will become apparent from the following detailed specification when read in connection with the accompanying drawings, in which:

FIG. 1 is a simplified schematic representation of the invention herein;

FIG. 2 illustrates certain mechanical details of the apparatus of FIG. 1;

Figure 3:
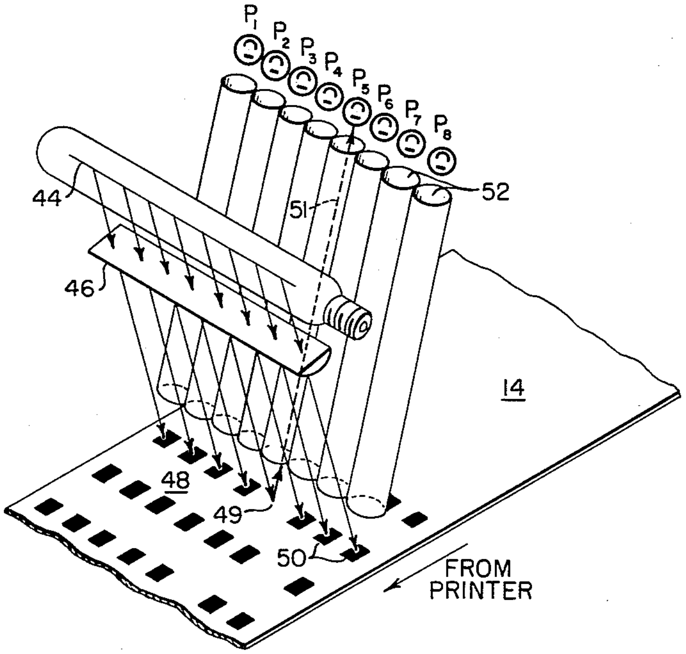
FIG. 3 illustrates the reading head of the apparatus of FIG. 1.

With reference now to the drawings, FIG. 1 illustrates a simplified schematic diagram of the invention herein in which input pulses $i$ are connected to characters which are applied to a recording medium 14. Such characters will appear in coded form, as marks on the recording medium. For control purposes, a clock pulse is also provided to signal the arrival of each input character, and corresponding clock marks will be present on the recording medium 14 corresponding to each character. Electrical pulse input signals which appear on the input $i$ are delayed by a time delay unit 22 in order to obtain sustained signals which are applied to the input I of the comparison circuit 20. Alternatively, the input signals are received in sustained form at the input in which case they are directly applied to the data transfer unit. The sustained input signals are applied to the input T of a data transfer unit 12. Upon actuation of the latter by the successive input signals, corresponding data characters are transferred to the data storage medium 14 where they appear in physical form. The data storage medium moves either stepwise or continuously in the direction of the arrow 16 and accommodates the successive data characters in response to successively applied input signals. A reading head 18 is positioned in close proximity to the data transfer apparatus 12 and is adapted to observe the physical form of the data characters on the data storage medium as the latter moves out from under the unit 12. An appropriate output signal is derived which corresponds to the physical form of the data character as it actually appears on the data storage medium and is applied to one input O of the comparison circuit 20. An output signal derived from the clock pulse mark is further delayed by a time delay unit 19 and applied as input $D_2$ to the comparison circuit 20 in order to trigger the comparison at the optimum moment. If coincidence of the compared signals is obtained, as indicated by an appropriate null signal on the comparison circuit output F, the data transfer operation continues. If, however, non-coincidence occurs, the signal which appears at the output F of the comparison circuit 20 disables the data transfer apparatus 12. Alternatively, the comparison output signal may be employed to provide a warning indication.

Since the invention makes use of a comparison of the output signal derived from the stored character with the actual input signal (or its equivalent) which gave rise to the data character, the reading head 18 and the data transfer head 12 must be close together to permit a rapid check of each data character prior to the approval of the subsequent input signal. It will be clear that a given spacing of these units, with a predetermined moving rate of the data storage medium, will determine the maximum data acceptance rate of the apparatus Since the comparison of the input and output signals corresponding to each data character occurs prior to the arrival of the subsequent input signal, as does the disabling action of the data transfer apparatus 12, continued operation after the printing of erroneous data characters, i.e. data characters not called for by the input signal applied to the input I, is prevented.

FIG. 2 is a schematic representation of a preferred embodiment of certain mechanical features of the apparatus of FIG. 1, in which applicable reference numbers have been retained. In this case, the data transfer action consists of printing consecutive data characters on the moving paper tape 14 in response to successively occurring digital input signals applied to the inputs $T_1$, $T_2$, . . . $T_8$. In the illustrated embodiment of the invention, an eight-bit code is used, one bit being employed as a parity check digit and another bit applied to $T_8$ being employed as a clock pulse. Accordingly, with the six remaining bits the representation of 64 distinct data characters is possible in the binary digital code.

The input signals which are applied to the input terminals $T_1$, $T_2$, . . . $T_8$ actuate selected ones of a series of eight individual hammers 28 of hammer module 30. Each hammer 28 has a striking surface on which a data symbol is engraved. In the preferred embodiment of the invention, the data symbols on the respective striking surfaces are alike and may consist of dots, lines, rectangles, or the like. Each hammer is movably disposed in order to permit its striking surface, upon actuation of the hammer, to strike the under-surface of the tape 14. An anvil 32 is spaced from the hammer module and is seen to be wedge-shaped in cross section. A color ribbon 34 travels between a pair of reels 36 and 38 about the wedge-shaped anvil 32. A ribbon guide 40 provides proper alignment of the ribbon 34. Tension in the ribbon is maintained by the action of a pair of drive motors 64 and 66 respectively, one of which at all times applies a restraining torque opposite to the ribbon winding direction. The actuation of the hammers by the application of an input signal to the input terminals $i_1$, $i_2$, . . . $i_8$ causes the selected hammers to strike the under-surface of the tape 14 and thus drives the tape as well as the color ribbon 34 against the facing surface of the anvil 32. As a result, the data symbols which are engraved on the striking surfaces of the actuated hammers are printed on the upper surface of the tape 14.

The reading head 18 is positioned above the tape 14 immediately adjacent the rounded end of the anvil 32. As may be seen more clearly from FIG. 3, the reading head consists of at least one light source 44 which is disposed above a cylindrical lens 46. The light incident on the lens 46 from the light source 44 strikes the paper tape 14 at an angle and is focused in a line thereon to illuminate the area of each printed data character 48 as it moves out from under the anvil. For the eight-bit code employed, the area of each data character consists of eight code symbol areas each of which either does or does not contain a printed code symbol 50. Each hammer 28 is thus adapted to print code symbols in a separate column of code symbol areas. Eight light-sensitive photo diodes $P_1$, $P_2$, . . . $P_8$ are positioned above a set of tubular shields 52 at such an angle as to receive the specular, reflected light from one of the aforesaid code symbol columns as the tape moves under the reading head. Each tubular shield 52 admits the light reflected from a single code symbol column only to its corresponding photo diode, the position of the shields relative to the tape 14 and to the light source 44 being chosen to bring about this result. It will be understood that the shields 52 not only confine each photo diode to the specular reflected light from a single code column but also serve to keep out ambient light.

As shown in FIG. 3, the incident light from the light source 44 which is focused to a line by the action of the lens 46 strikes the area of each code symbol of the data character 50 which is under examination. Where a code symbol appears, the amount of light reflected is small and will produce a correspondingly small output signal from the photo diode. Where no code symbol appears, as in location 49, the light beam 51 which is reflected from a blank code symbol area produces an output pulse in the photo diode $P_5$.

Reverting now to FIG. 2, the output O of the reading head 18 is represented as a single wire for the sake of simplicity although in practice eight parallel lines are employed for the eight-bit code of the preferred embodiment. The output O is connected as one input of the comparison circuit 20 whose other input I receives the aforesaid sustained or delayed input signal. A third input consists of an output signal of the reading head corresponding to the clock pulse and suitably delayed by unit 10. The output F of the comparison circuit 20 is connected to energize a relay 57 which is adapted, upon non-coincidence of the compared signals, to open the line switches 58, 60, and 62. Upon being opened, the switch 58 will interrupt the application of power to the ribbon drive motor 64 which is mechanically coupled to the ribbon reel 38. Similarly, the energizing switch 60 is adapted to interrupt the application of power to the ribbon drive motor 66 which is mechanically coupled to the ribbon reel 36.

Alternatively, or in addition to the foregoing, an alarm may be actuated from output F. Similarly, the output signal may be used to interrupt the further flow of input signals or to control the transmission of input signals or to print an error indication on the tape. The ribbon drive motors 64 and 66 respectively are adapted to drive the ribbon in opposite directions, the appropriate motor being energized when one of the reels has exhausted its ribbon. Upon being opened, the energizing switch 62 will interrupt the application of power to a tape drive motor 68. Although a continuous tape drive may be used, the tape is preferably driven in steps which may be accomplished by providing sprocket holes in the tape engaged by a suitable sprocket wheel coupled to the motor 68. Alternatively, a tape drive roll 70 is engaged in step by a suitable clutch mechanism coupled to the motor 68. The tape drive roll in turn engages the underside of the tape 14 and cooperates with a pressure roll 72 to grip the tape under pressure so that motion may be imparted thereto. A lift mechanism 73 capable of lifting the pressure roll off the tape is provided in order to disable the tape drive rapidly. The lift mechanism 73 is controlled from a solenoid (not shown) which, in turn, is actuated by the relay 57. In the illustrated embodiment non-coincidence of the input and output signals which correspond to a given data character produces a non-coincidence signal which energizes the relay 57 and opens the energizing switches 58, 60, and 62, and may also serve to lift the pressure roll 72 off the tape. This action occurs prior to the actuation of the hammers by subsequently arriving input signal. As a result, the tape and ribbon drives are de-energized and no further data characters can be transferred to the tape.

Figure 4:
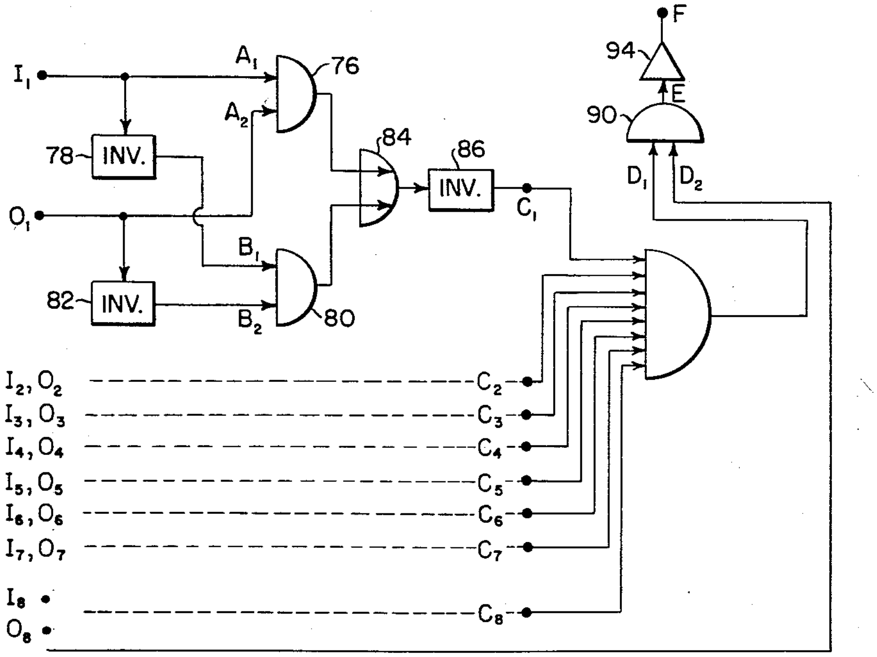
FIG. 4 is a schematic circuit diagram of the apparatus of FIG. 1.

FIG. 4 is a schematic representation of a preferred embodiment of the comparison circuit of the invention wherein two eight-bit code signals are compared. Applicable reference numbers have been retained. Each input signal corresponding to a single data character is directly applied to actuate the hammers while being suitably sustained or delayed prior to being applied to a first set of input terminals $I_1$, $I_2$, . . . $I_8$. An output signal, which is derived from the reading head and which corresponds to the same data character, is applied to a second set of comparison circuit input terminals $O_1$, $O_2$, . . . $O_8$, in synchronism with the input signal. The output signal which is applied to the terminal $O_8$ is further delayed in the time delay unit 10 to provide a trigger pulse for application to the comparison circuit.

The respective sets of input terminals are grouped into pairs, the circuit associated with each input terminal pair being identical in construction. For the sake of simplicity, only the circuit associated with the input terminal pair $I_1O_1$ is represented in FIG. 4. Each pulse appearing at the terminal $I_1$ is applied as a direct signal pulse to the "and" gate 76 by way of an input $A_1$. Each pulse appearing on the input terminal $I_1$ is further applied to an inverter 78, whence it is coupled as a logically inverted signal to an "and" gate 80 by way of an input $B_1$. In similar manner each pulse appearing on the input terminal $O_1$ is directly applied to the "and" gate 76 by way of an input $A_2$, as well as being logically inverted by the action of an inverter 82 and being applied to an "and" gate 80 by way of input $B_2$. The "and" gates 76 and 80 respectively are of the type which require input pulses to be present simultaneously on all the inputs thereof in order to provide an output pulse. The outputs of both "and" gates 76 and 80 are coupled to an "or" gate 84 which is of the kind that requires a pulse to be present on only one of its inputs in order to provide an output signal. The output derived from the "or" gate 84 is applied to an inverter 86 whence it appears as a digitally inverted pulse signal on the terminal $C_1$. In similar manner, the pulses applied to the remaining input terminals provide pulse signals on the terminals $C_2, \ldots C_8$. The pulse signals appearing on the terminals $C_1, C_2, \ldots C_8$ are applied to an "and" gate 88 whose output $D_1$ is connected to one input $D_1$ of another "and" gate 90. A second input $D_2$ of the aforesaid "and" gate 90 is connected to the output of time delay unit 10. The output E of the "and" gate 90 is connected to the input of an amplifier 94, whose output signals appear at a terminal F.

In discussing the operation of the apparatus of FIG. 4, it will be appropriate to discuss certain features which have application to digital data processing systems in general. In its electrical state, each digital data character consists of a number of data pulses or the absence of data pulses which are referred to as binary Ones or Zeros and which move in synchronism along parallel paths. Where an eight-bit code is used, eight parallel paths are required. Synchronism is maintained by means of appropriate clock pulses which, in the preferred embodiment, are carried in the data stream. In the terminology employed herein all the binary Ones and Zeros, which together are representative of a single data character, are referred to as an input signal. Successive input signals representative of successive data characters are applied to the input terminals $T_1, T_2, \ldots T_8$ of the hammer module illustrated (see FIG. 2) in order to actuate the hammers as well as to the first set of input terminals $I_1, I_2, \ldots I_8$ of the comparison circuit which is illustrated in FIG. 4. The output signals derived from the reading head are successively applied to the second set of input terminals $O_1, O_2, \ldots O_8$ of the comparison circuit, the signal on the terminal $O_8$ being further applied to the time delay unit 10. The original input signals arrive either in sustained fashion or their time delay is chosen so that the input and output signals corresponding to a given data character are simultaneously applied to the respective input terminals of the comparison circuit. The delayed trigger pulse derived from the terminal $O_8$ then triggers the comparison preferably at a point corresponding to the center of the output pulses. The close positioning of the reading head to the anvil assures that at the rate of tape movement an output signal is derived in time to permit a comparison to be carried out at the maximum data acceptance rate prior to the actuation of the hammers by the subsequent input signal.

As previously pointed out, two of the binary digits in the data stream are employed as clock pulses and parity check bits respectively. Sixty-four unique combinations are thus available with the remaining six digits to represent as many different data characters. Each data character is represented by different combinations of binary Ones and Zeros and hence, the presence or absence of pulses on the input terminals of the comparison circuit (and of the hammer module) determines the data character which is electrically represented in binary digital code.

The data pulses moving in a single data path may be logically "inverted" by providing a pulse where there was an absence of a pulse before, or by deleting the pulse which was previously present. One example of such inversion is illustrated in the apparatus of FIG. 4. As previously pointed out, an "and" gate provides an output pulse when input pulses appear simultaneously on all the inputs thereof. Thus, the "and" gate 76 in FIG. 4 will provide an output pulse if input pulses appear at both inputs $A_1$ and $A_2$, i.e. if input pulses are applied to the input terminals $I_1$ and $O_1$. The absence of a pulse, i.e. a binary Zero on one or both of these input terminals, will render the gate 76 non-conductive. Similarly, a binary One on one or both of these terminals will render the "and" gate 80 non-conductive due to the action of the inverters 78 and 82 which convert such a pulse to a binary Zero. On the other hand, the application of binary Zeros to both of the input terminals will provide binary Ones at the inputs $B_1$ and $B_2$ and will render the "and" gate 80 conductive.

The "or" gate 84 provides an output pulse, i.e. a binary One, if a binary One appears on one or on both of its inputs. This output is inverted by the inverter 86 in order to provide a binary Zero at the terminal $C_1$.

It thus becomes clear that the circuit discussed above performs a coding function. An output pulse, i.e. a binary One, will appear on the terminal $C_1$ only if a binary Zero is provided at the output of the "or" gate 84. Such a signal, in turn, calls for a situation where no signal is received at the input of the "or" gate 84 from either one of the "and" gate 76 and 80. The latter is possible only when a binary One appears on one of the input terminals $I_1$ and $O_1$ and a binary Zero appears on the other input terminal.

In order for the "and" gate 88 to provide a binary One at its output, binary Ones must appear on each of the terminals $C_1, C_2, \ldots C_8$. This, in turn, calls for the appearance of different binary digits on each of the pairs of the comparison circuit input terminals. If a binary One appears at the input $D_1$ of gate 90 and a binary One further appears on the input $D_2$, the "and" gate 90 becomes conductive and provides an output pulse at the output E. This pulse is amplified by the amplifier 94 and appears at the terminal F, where it is available to carry out the functions described above to provide a warning signal or to actuate the print disabling relay 57 of FIG. 2.

The components of the comparison circuit illustrated in FIG. 4 are conventional and are subject to many variations well known to those skilled in the art. Similarly, as pointed out above, the mechanical details of the apparatus illustrated in FIG. 2 are subject to such variations as suit the particular needs of a given situation. For example, the relative transposition of the hammer module, the tape, the ribbon and the anvil is possible. The hammer module may take any desired form.

The latter also applies to the data symbols which are engraved on the striking surfaces of the hammers themselves. Although it is convenient to provide data symbols in the form indicated to print a digital data character, the invention is not limited thereto, provided only that a difference of reflectivity between the printed and unprinted portions of the tape is observed. The head is similarly subject to variation and may contain either photo-resistive or photo-conductive elements.

The alternatives concerning the tape drive have been discussed above. Either a continuous drive or a step drive may be employed. In the latter case, a sprocket wheel drive may be used which engages sprocket holes in the tape. Alternatively, a suitable clutch mechanism which transmits power from the tape drive motor to the tape drive roll may be actuated in steps.

As previously discussed, the action which occurs upon non-coincidence of the compared signals may vary according to the particular needs of the situation. In certain cases it is sufficient to sound an alarm or to print an error symbol, while in other cases the apparatus must be capable of interrupting the data transfer action. As pointed out above, the latter may be carried out in a number of ways, e.g. by disabling the tape drive, by disabling the hammer module, or by interrupting the input data flow.

The invention is not limited to the transfer of data characters by printing on a tape with a color ribbon, but is equally applicable where a pressure-sensitive tape is used. In its broadest concept, the invention is applicable to any data processing apparatus wherein data characters in electrical form are transferred onto a data storage medium, where they appear in a physical form which is observable or which can be sensed. The basic concept of the invention thus relates to self-checking data processing apparatus wherein a comparison is carried out between the input and output signals which correspond to each data character, prior to the arrival of the next input signal at the maximum data acceptance rate.

From the foregoing disclosure of the invention, it will be apparent that numerous modifications, departures, and equivalents will now occur to those skilled in the art, all of which fall within the true spirit and scope of this invention.

We claim:

1. Apparatus for printing consecutive data characters in digital code in response to successive digitally encoded input signals applied at input rates up to a maximum data acceptance rate, comprising a hammer module having a plurality of movable hammers, each of said hammers having a code mark engraved on its striking surface, an anvil spaced from said module, tape step drive means for moving a data tape at a predetermined rate through the space between said module and said anvil, ribbon drive means for moving a color ribbon between said tape and said anvil, means responsive to said input signal for selectively actuating said hammers to drive said tape and said ribbon against said anvil, said hammer actuation being adapted to print code symbols selectively on said tape into adjacently disposed columns of code symbol areas, each of said columns corresponding to one of said hammers, a reading head disposed in close proximity to said anvil and being adapted to observe said printed tape, said reading head comprising at least one light source positioned to illuminate said printed tape, a plurality of photo diodes each responsive to the specular, reflected light from successive code symbol areas of one of said columns to provide corresponding output pulses, the output pulses corresponding to respective data characters being derived in synchronism to form digitally encoded output signals, a comparison circuit for comparing the input and output signals corresponding to each data character to provide a signal upon non-coincidence of said compared signals, the position of said reading head relative to said anvil being so related to said rate of movement of said data tape to provide said non-coincidence signal prior to hammer actuation by the subsequent input signal applied at said maximum acceptance rate.

2. The apparatus of claim 1 and further comprising means responsive to said non-coincidence signal to provide a warning indication.

3. The apparatus of claim 1 wherein said anvil is substantially wedged-shaped in cross section, said wedge having a rounded end adjacent said reading head, means for amplifying said non-coincidence signal, said tape drive means comprising a paper guide adapted to support said moving tape, a tape drive motor, a tape drive roll coupled to the shaft of said tape drive motor, a rotatable pressure roll adapted to bear against said tape drive to grip said tape therebetween and to impart motion to said tape, means responsive to said amplified non-coincidence signal to lift said pressure roll off said tape and to de-energize said tape drive motor, ribbon moving means comprising a pair of ribbon drive motors each having a reel coupled to its output shaft, said ribbon being adapted to travel under tension between said reels around said anvil end, said ribbon drive motors being adapted to move said ribbon in opposite directions depending on the exhaustion of one of said reels, and means responsive to said amplified coincidence signal to de-energize said ribbon drive motors.

4. The apparatus of claim 1 wherein said comparison circuit comprises two equal series of paired input terminals, each terminal pair being connected to receive one of said input and one of said output signals respectively, means for deriving direct and inverted signals respectively from each of said input terminals, a pair of first and second "and" gates associated with each of said input terminal pairs and connected to be energized by the direct and inverted signals respectively derived therefrom, an "or" gate connected to the output of each pair of said first and second "and" gates, equal series of said "or" gates being associated with respective ones of said series of input terminals, a pair of third "and" gates each energized from one of said series of "or" gates, a fourth "and" gate energized from said pair of third "and" gates and being adapted to provide said non-coincidence signal at its output, and means for amplifying said last recited signal.

5. The apparatus of claim 4 and further comprising means responsive to said amplified non-coincidence signal for synchronously de-energizing said tape and ribbon drive means.

6. A self checking data printer adapted to receive successive digitally encoded input signals at input rates up to a maximum data acceptance rate, comprising in combination printing means responsive to said input signals to print consecutive data characters in digital code on a data storage medium moving at a predetermined rate, means responsive to light reflected from said storage medium to provide successive digital output signals corresponding respectively to said printed data characters, means for comparing the input and output signals corresponding to respective ones of said data characters to provide a comparison signal, said light-responsive means being positioned in close proximity to said printing means to permit each comparison to be completed at said predetermined data storage medium moving rate prior to the printing action produced by the subsequent input signal arriving at said maximum data acceptance rate, and means responsive to said comparison signal for controlling the supply of input signals to said printing means.

7. A self-checking data printer adapted to be energized by successive input signals at input rates up to a maximum data acceptance rate comprising, an anvil, a hammer module including a plurality of movable hammers each adapted to be actuated to engage said anvil with its striking surface, a data symbol engraved on each of said striking surfaces, said data symbols being adapted for selective combination to form data characters, a tape step drive for moving a data tape at a predetermined rate past said hammer module in the space between said striking surfaces and said anvil, a ribbon drive for moving a color ribbon relative to said anvil and adjacent thereto, means responsive to each of said input signals for selectively actuating said hammers to print a data character on said tape, means for illuminating said tape, means responsive to the light reflected from said tape in the area of each printed data character to provide an output signal prior to the arrival at said maximum data acceptance rate of a subsequent input signal, said last recited means being adapted to provide said output signal at said predetermined tape moving rate, means for comparing the input and output signals corresponding to each of said data characters for non-coincidence, and means responsive to non-coincidence of said compared signals for disabling said tape and ribbon drives.

References Cited in the file of this patent

UNITED STATES PATENTS

| | | |
|---|---|---|
| 1,978,893 | Carroll | Oct. 30, 1934 |
| 2,016,709 | Eichenauer | Oct. 8, 1935 |
| 2,265,445 | Paris | Dec. 9, 1941 |
| 2,307,109 | Bryce | Jan. 5, 1943 |
| 2,482,242 | Brustman | Sept. 20, 1949 |
| 2,603,151 | Bryce | July 15, 1952 |
| 2,702,380 | Brustman | Feb. 15, 1955 |